(12) United States Patent
Bertoni et al.

(10) Patent No.: US 9,152,383 B2
(45) Date of Patent: Oct. 6, 2015

(54) METHOD FOR ENCRYPTING A MESSAGE THROUGH THE COMPUTATION OF MATHEMATICAL FUNCTIONS COMPRISING MODULAR MULTIPLICATIONS

(71) Applicant: STMicroelectronics S.r.l., Agrate Brianza (IT)

(72) Inventors: Guido Marco Bertoni, Carnate (IT); Ruggero Susella, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 61 days.

(21) Appl. No.: 13/669,213

(22) Filed: Nov. 5, 2012

(65) Prior Publication Data
US 2013/0114806 A1 May 9, 2013

(30) Foreign Application Priority Data

Nov. 3, 2011 (IT) .............................. MI2011A1992

(51) Int. Cl.
*H04K 1/00* (2006.01)
*G06F 7/72* (2006.01)
*H04L 9/30* (2006.01)

(52) U.S. Cl.
CPC ........ *G06F 7/728* (2013.01); *G06F 2207/7238* (2013.01); *H04L 9/302* (2013.01); *H04L 9/3006* (2013.01)

(58) Field of Classification Search
CPC ............ G06F 2207/7238; G06F 7/728; H04L 9/3006; H04L 9/302
USPC ....................................................... 380/28, 30
See application file for complete search history.

(56) References Cited

U.S. PATENT DOCUMENTS

| 8,243,919 | B2 * | 8/2012 | Ebeid .............................. 380/30 |
| 8,265,266 | B2 * | 9/2012 | Ciet et al. ........................ 380/28 |
| 8,527,570 | B1 * | 9/2013 | Shu et al. ...................... 708/491 |

(Continued)

FOREIGN PATENT DOCUMENTS

WO 2005048008 5/2005

OTHER PUBLICATIONS

Jen-Wei Lee, "An Efficient Countermeasure against Correlation Power-Analysis Attacks with Randomized Montgomery Operations for DF-ECC Processor" pp. 548-564, 2012.*

(Continued)

*Primary Examiner* — Samson Lemma
(74) *Attorney, Agent, or Firm* — Seed IP Law Group PLLC

(57) ABSTRACT

An embodiment concerns a method for encrypting a message through a cryptographic algorithm including a computation of a mathematical function including the computation of one or more modular multiplications. Such a cryptographic algorithm has a respective module. The method, carried out with an electronic device, includes: providing a first parameter; generating a random number; calculating a Montgomery parameter based on said first parameter and on a integer multiple of said random number; generating a representation of the message to be encrypted in a Montgomery domain through a Montgomery conversion function applied to the message and to the Montgomery parameter; carrying out the calculation of the mathematical function on the message represented in the Montgomery domain.

13 Claims, 1 Drawing Sheet

(56) References Cited

U.S. PATENT DOCUMENTS

2009/0214025 A1* 8/2009 Golic .............................. 380/28
2010/0064142 A1* 3/2010 Matsuzaki .................... 713/189

OTHER PUBLICATIONS

Peter L. Montgomery, "Modular Multiplication Without Trial Division", Mathematics of Computation by American Mathematical Society, vol. 44., No. 170, Apr. 1985, pp. 519-521.
Search Report for Italian Application No. MI20111992, Ministero dello Sviluppo Economico, The Hague, Feb. 3, 2012, pp. 2.
Apostolos P. Fournaris, Odysseas Koufopavlou: "Efficient CRT RSA with SCA countermeasures", 2011 IEEE; 2011, 14th Euromicro Conference on Digital System Design, pp. 593-599.
Frederic Amiell, Benoit Feix, Michael Tunstall, Claire Whelan, William P. Marnane: "Distinguishing Multiplications from Squaring Operations", SAC 2008, LNCS 5381, pp. 346-360, 2009.
Daniel Page and Nigel P. Smart, "Parallel Cryptographic Arithmetic Using a Redundant Montgomery Representation", IEEE Transactions on Computers, vol. 53, No. 11, Nov. 2004, pp. 1474-1482.
"Exponentiation by squaring," Wikipedia, retrieved on Apr. 8, 2015, from http://en.wikipedia.org/wiki/Exponentiation_by_squaring, 10 pages.
Diffie et al., "New Directions in Cryptography," *IEEE Transactions on Information Theory IT*-22(6):644-654, Nov. 1976.
Kaya Koç et al., "Analyzing and Comparing Montgomery Multiplication Algorithms," *IEEE Micro* 16(3):26-33, Jun. 1996.
Kocher et al., "Differential Power Analysis," CRYPTO'99, LNCS 1666, Springer-Verlag Berlin Heidelberg, 1999, pp. 388-397.
National Institute of Standards and Technology, "Digital Signature Standards (DSS)," Federal Information Processing Standards Publication, FIPS PUB 186-1, Dec. 15, 1998, 23 pages.
Rivest et al., "A Method for Obtaining Digital Signatures and Public-Key Cryptosystems," *Communications of the ACM* 21(2):120-126, Feb. 1978, 15 pages.

* cited by examiner

METHOD FOR ENCRYPTING A MESSAGE THROUGH THE COMPUTATION OF MATHEMATICAL FUNCTIONS COMPRISING MODULAR MULTIPLICATIONS

PRIORITY CLAIM

The instant application claims priority to Italian Patent Application No. MI2011A001992, filed Nov. 3, 2011, which application is incorporated herein by reference in its entirety.

TECHNICAL FIELD

An embodiment refers to techniques for encrypting digital data, and, in particular, to an embodiment of a method for encrypting a message through an algorithm using mathematical functions which foresee a computation of one or more modular multiplications. Even more in particular, an embodiment is a method for encrypting a message in which such a computation of modular multiplications is substantially immune to "Side-Channel Attacks" or SCA.

BACKGROUND

Nowadays, cryptography has an essential role in the communication of digital data so as to ensure a suitable level of security of the communication through the satisfying of requirements such as confidentiality and the privacy of the exchanged digital data.

The most frequently used cryptographic algorithms such as, for example, the Diffie-Hellmann algorithm, asymmetric key algorithms RSA and DSA (Digital Signature Algorithm), and ECC (Elliptic Curve Cryptosystem) often require the carrying out of modular mathematical operations on whole numbers consisting of thousands of bits.

Such modular mathematical operations comprise, for example, modular multiplications and computation operations of modular exponential functions.

Such mathematical operations can become vulnerable to different types of attacks developed by code crackers which continuously attempt, from an electronic and/or information point of view, to violate the already-existing cryptographic algorithms, in particular those with asymmetric keys. Among the most recent and dangerous types of attack, SCA (Side-Channel Attacks) can jeopardize the security of secret keys used in encrypting/decrypting operations.

In particular, a Side-Channel Attack SCA is an attack by which the recovery of secret information (in particular, the secret key) is obtained by a code cracker without exploiting particular weaknesses in the corresponding mathematical theory, but rather by exploiting problems related to the physical implementation of the cryptographic algorithm itself. For example, a Side-Channel Attack can consist, by the code cracker, of monitoring timing information, or of measuring power consumption or electromagnetic emissions during the encrypting/decrypting operations. Moreover, such an attack can consist of injecting a fault (e.g., overvoltage or glitch, also undervoltage) in the electronic device configured so as to implement a cryptographic algorithm, for example, through a laser or by altering a supply voltage. From the comparison between the encrypted message obtained by the electronic device in the case in which there is an injected fault and the encrypted message obtained by the electronic device in the case of normal operation (without perturbations by the code cracker) or by monitoring power consumption, a code cracker may be capable of obtaining fundamental information for successfully recovering the secret key used by electronic devices under attack.

A Side-Channel Attack of the known type is Differential Power Analysis (DPA), which is based upon a measurement of power consumption of an electronic device arranged for carrying out encrypting/decrypting operations.

For example, the DPA attack can be aimed against cryptographic algorithms which foresee modular computation operations of exponential functions, as occurs, for example, in algorithms with asymmetric keys RSA and DSA. For example, with reference to the RSA algorithm, an encrypted message c is obtained from an uncoded message m through the computation of a modular exponential function in a mathematical ring of the integer numbers $\mathbb{Z}_n$ module n (in which n is the product of two prime numbers) expressed by the following relationship:

$$c = m^e \bmod n \quad (1)$$

in which:
e is a public exponent of the algorithm RSA, in particular it is a part of the public key used by such an algorithm;
mod n represents an operation of modular reduction relative to the aforementioned mathematical ring $\mathbb{Z}_n$. It should be observed that the module n is part of the public key relative to the algorithm RSA.

Similarly, the un-encoded message m can be obtained again by decrypting the encrypted message c through the computation of a further exponential function of the modular type expressed from the following relationship:

$$m = c^d \bmod n \quad (2)$$

in which d represents the secret key used by the RSA algorithm.

It should be observed that the modular computation operations of exponential functions (1) and (2) mentioned above are calculated, generally, by carrying out a multitude of modular multiplications through a conventional Square and Multiply Algorithm.

As it is known, an electronic device that carries out modular multiplications corresponding to the computation of one of such exponential functions, for example the function (2) relative to the operation of decrypting a message c with secret key d, consumes some power. In a DPA attack, such a power consumption can be measured with an oscilloscope and can be represented in the form of a multitude of power traces.

In addition, for each modular multiplication suitable for approximating the relationship (2), the code cracker is capable of knowing both an item of input data to such an operation, and a result from the multiplication generated as a function of a bit of the secret key d. Therefore, on the basis of a forecast of the result generated by each modular multiplication and on the basis of a processing of measured power traces, the DPA method may allow the code cracker to reconstruct each bit of the secret key d of the algorithm RSA.

Some methods have recently been developed to counter the DPA Side-Channel Attack, with reference, in particular, to a decrypting operation of an encrypted message c. Each of such methods, which are conventional and which are commonly known as blinding methods or techniques, foresees the introduction in the decrypting operation (2) of a secret parameter, for example, a number generated in a random manner rand. Indeed, the introduction of such a random number rand makes the DPA attack very difficult or substantially impossible since the computation of the exponential decrypting function (2) is carried out on an item of data which has been suitably blinded from the random number, and, therefore, which has become, in such a way, unknown to the code cracker.

Such known blinding methods shall be described, for example, with reference to the decrypting operation (2) of an encrypted message c relative to the RSA algorithm. Analogous considerations can also be applied to the DSA algorithm and to other algorithms with a public key.

A first known blinding method foresees the introduction of the aforementioned random number rand in the message c to be decrypted. An intermediate result C1 of the decrypting operation can, therefore, be expressed as:

$$C1=(c*\text{rand}^e)^d \bmod n \quad (3)$$

which, based on the relationship (1), is equal to:

$$C1=(m^e*\text{rand}^e)^d (\bmod n)=m*\text{rand}(\bmod n) \quad (4)$$

since $(\text{rand}^e)^d=\text{rand} \bmod n$ and $(m^e)^d=m(\bmod n)$.

In order to obtain the un-encoded message m again, the intermediate result C1 is further multiplied by the inverse of the random number rand.

Such a first blinding method has the drawback of requiring the computation of the modular inverse of the random number rand so as to restore the original un-encoded message m. Indeed, as it is known, the inversion operation is an expensive operation in terms of computational time required. Moreover, such a first method requires the computation of the additional exponential function $\text{rand}^e$.

A second known blinding method foresees the introduction of the aforementioned random number rand in the modular reduction operation. In particular, the module n is multiplied by the aforementioned random number rand so as to obtain:

$$n'=\text{rand}*n \quad (5)$$

In such a case, a respective intermediate result C2 of the decrypting operation can be calculated through the following relationship:

$$C2=c^d \bmod n' \quad (6)$$

Such an intermediate result C2 must still undergo an operation of modular reduction for n so as to restore the original un-encoded message m:

$$m=C2 \bmod n=c^d \bmod n=m \quad (7)$$

In other words, such a second method has the drawback of requiring the computation of an additional modular reduction operation. Moreover, such a second method is not very versatile since it imposes restrictions on the random number rand, which cannot be zero, so as to prevent the whole operation from returning to zero.

A third known blinding method foresees the introduction of the random number rand in the private key d used to decipher the encrypted message c. In particular, from the aforementioned random number rand, a new private key d' can be calculated based on the relationship:

$$d'=d+\text{rand}*\text{phi}(n) \quad (8)$$

i.e., adding to the private key d a random multiple of phi(n), where phi(n) is the known Euler function.

With reference to the aforementioned decryption operation (2), the un-encoded message m can be obtained based upon the following relationship:

$$c^{d'}(\bmod n)=c^{d+\text{rand}*\text{phi}(n)}(\bmod n)=c^d*c^{\text{rand}*\text{phi}(n)}(\bmod n)=c^d*1(\bmod n)=c^d(\bmod n)=m \quad (9)$$

since Euler's theorem is valid $$c^{k*\text{phi}(n)} \bmod n=1 \text{ for each } c, k \text{ and } n. \quad (10)$$

It should be observed that such a third method has the drawback of requiring an increase in the exponent in function of the size of the random number rand. In such a way, for every additional bit of the exponent, it is necessary to carry out many modular multiplications. Moreover, such a method requires the storage of the Euler function phi(n) in a memory of the electronic device that implements the method.

SUMMARY

To this day, there is the strong need of developing new methods that are suitable for opposing Side-Channel or SCA attacks, in particular, of the DPA type.

An embodiment is a method for encrypting a message with an algorithm using mathematical functions which foresee a computation of one or more modular multiplications, in which such a computation of modular multiplications is substantially immune to Side-Channel Attacks, in particular of the DPA type.

Moreover, an embodiment is a method for encrypting a message which is an alternative to known methods and makes it possible to overcome, at least partially, the drawbacks mentioned above related to such methods.

An embodiment is an electronic device configured so as to implement the aforementioned cryptography method.

An embodiment is a smart-card suitable for implementing such a method.

And an embodiment is a corresponding computer program, and a tangible computer-readable medium storing the program.

BRIEF DESCRIPTION OF THE DRAWINGS

Characteristics and advantages of one or more embodiments shall become clearer from the following description, given as an indication and not for limiting purposes, with reference to the attached figures, in which.

DETAILED DESCRIPTION

Figure 1:
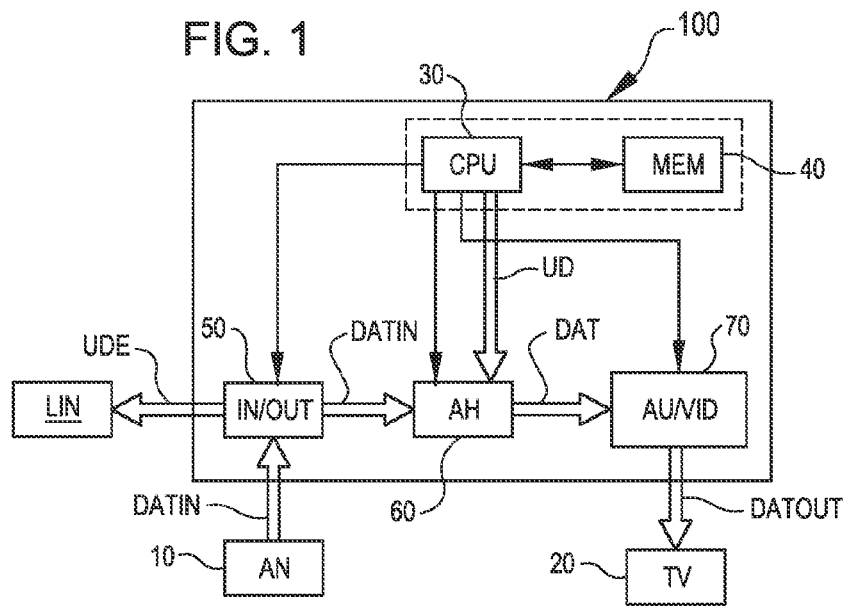
FIG. 1 schematically illustrates an electronic device configured so as to implement the cryptography method of a message according to an embodiment.

With reference to FIG. 1, we shall now describe an example of an electronic device, generally indicated with reference numeral 100, configured to perform a method for encrypting a message according to an embodiment, which embodiment shall be described in the rest of the description.

Such an electronic device 100 is, for example, a device for encrypting/decrypting digital television known also as set-top box. In accordance with other embodiments, such a device can be another electronic device in which a method for encrypting a message is implemented, such as, for example, a mobile telephone, a digital terrestrial or satellite receiver, a video-game console (for example, PS3), a computer (for example, a personal computer), a tablet, or a generic peripheral device (for example, a printer).

In the rest of the description, with reference to FIG., we shall describe in greater detail an example of an electronic device 100 such as the device for encrypting/decrypting digital televisions.

Such a device for encrypting/decrypting 100 a digital television is configured so as to receive a flow of encrypted input data DATIN (video and/or audio data) by an external antenna 10 (ANT) so as to provide a corresponding flow of decrypted data DATOUT to a television apparatus 20 (TV) operationally coupled to the encrypting/decrypting device 100.

In greater detail, the encrypting/decrypting device 100 includes a CPU (Central Processing Unit) 30, for example a microprocessor or a microcontroller, operationally coupled to a main system memory 40 (MEM). Such a memory 40 can be external to the central processing unit 30 or inside the aforementioned processor unit. Moreover, the encrypting/decrypting device 100 includes an input/output module 50 (IN/OUT) operationally coupled and controlled by the central processing unit 30 (CPU) so as to receive the flow of encrypted input data DATIN.

In addition, the encrypting/decrypting device 100 includes an electronic module 60 (AH) arranged for encrypting/decrypting digital data. In greater detail, the electronic module 60 is a hardware accelerator operating under the control of the central processing unit 30 so as to decrypt the flow of encrypted data DATIN received by the input/output device 50. Particularly, the hardware accelerator 60 is configured to receive activation signals from the central processing unit 30 for decrypting the flow of encrypted data DATIN and to send encrypted data DAT to an audio/video decoder 70 (AU/VID) that is suitable for providing (under the control of the central processing unit 30 to which it is operationally coupled) the flow of decrypted data DATOUT to the television apparatus 20.

It should be noted that the electronic encrypting/decrypting device 100 is provided for loading and running program codes for implementing a cryptography method according to an embodiment.

In particular, in the described example, it is the hardware accelerator 60 that is configured for loading and running program codes so as to allow the electronic device 100 to implement such a method. The central processing unit 30 operatively associated with the hardware accelerator 60 is configured so as to send the hardware accelerator instructions necessary to load the data, to start carrying out the cryptography method, and to read the outputs.

In the case in which there is no hardware accelerator 60, it is the central processing unit 30 that directly carries out the function of an electronic module arranged for loading and running the program codes for implementing a method according to an embodiment.

It should be observed that the encrypting/decrypting device 100 is moreover configured so as to allow the interaction of a user with the provider of the television broadcasting. For example, in the case in which a user desires to select a television program, it is necessary for user data UD, which identify the subscription to the digital television bought by the user, to be supplied to the provider. Typically, the user data UD are stored in the memory 40 (MEM) of the encrypting/decrypting device 100. Alternatively, the user data UD is stored in an auxiliary portable memory (not shown in FIG. 1) operatively interfaced with the central processing unit 30.

In this case, the hardware accelerator 60 is configured so as to receive the user data UD from the central processing unit 30 and encrypt the user data UD generating encrypted user data UDE. The encrypting/decrypting device 100 is configured so as to provide the encrypted user data UDE to the input/output module 50 to be sent to the provider of the television broadcasting using an external line LIN (for example, a telephone line) operatively coupled to the encrypting/decrypting device 100.

In an embodiment, it should be observed that the aforementioned electronic device is in the form of a smart-card 100, which includes a respective central processing unit 30 associated with a respective memory 40 and coupled to means for transmitting-receiving signals. Such a processing unit 30 of the smart card is configured for loading and running the program codes to perform the encrypting/decrypting of digital data in accordance with an embodiment.

Figure 2:
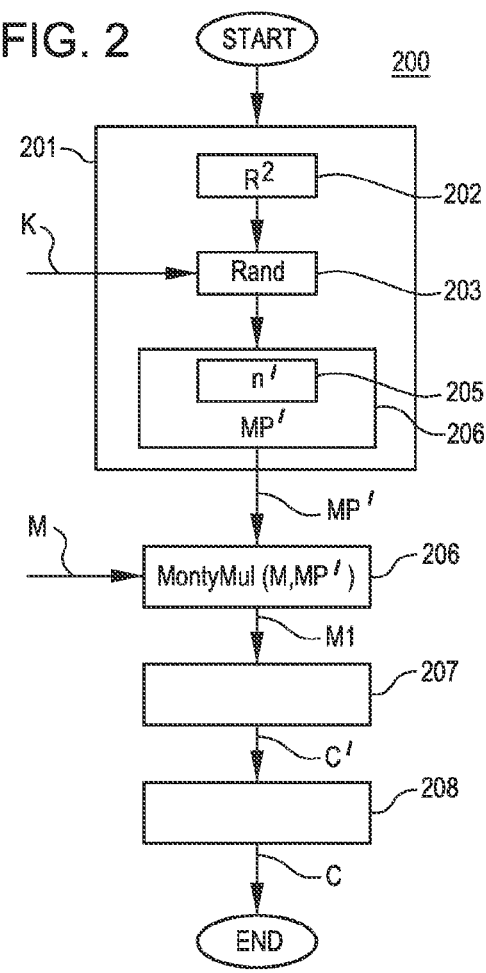
FIG. 2 schematically illustrates, with a block diagram, a method for encrypting a message according to an embodiment.

With reference to FIG. 2, we shall now describe in detail an embodiment of a method 200 for encrypting a message M.

In the rest of the present description the term "method for encrypting a message" refers, without distinction, to encryption operations, decryption operations, or digital signatures applied to the aforementioned message M. Moreover, for the purposes of the present description, "message M" means the groups of digital data of which it is necessary for the electronic device 100 (for example, set-top-box or smart-card) to carry out the encryption, decryption, or digital signature through the implementation of the method 200.

Moreover, for the sake of simplicity of the description, the method 200 is described with reference to an application of a cryptographic algorithm that includes the computation of calculated modular exponential functions by carrying out a plurality of modular multiplications, like, for example, the cryptographic algorithm RSA. Analogous considerations are valid also for the DSA algorithm.

In general, it should be observed that an embodiment for encrypting a message can be, advantageously, used for other cryptographic algorithms that foresee the computation of one or more modular multiplications like, for example, the algorithm ECC (Elliptic Curve Cryptosystem).

In the cryptographic algorithm RSA, a single operation of modular multiplication, or a series of modular multiplications, are, generally, calculated by using a known multiplication method proposed by Peter L. Montgomery and described in the document "Modular multiplication Without Trial Division", Math. Computation, vol. 44, pp. 519-521, 1985, which is incorporated by reference. Such a method has an advantage of simplifying the operations of modular reduction by speeding up the computation required to perform each modular multiplication.

Before proceeding with a more detailed description of the method 200, it is worth reviewing some known properties of the multiplication method proposed by Montgomery.

In greater detail, such a method foresees the transformation of each factor of a generic modular multiplication, for example $$c = a * b \pmod{n} \tag{11}$$

defined in a mathematical ring $\mathbb{Z}_n$ of the integer-numbers module n, to a corresponding factor of a residual modular system or Montgomery domain. The aforementioned transformation is obtained by multiplying the factors a and b of the modular multiplication by a number R that is coprime with, and greater than, the module n. Such a number is generally indicated with the term "Montgomery constant".

Based on such a number R, the factors a and b of the multiplication (11) can be expressed in the Montgomery domain as:

$$a1 = a * R \pmod{n} \tag{12}$$

$$b1 = b * R \pmod{n} \tag{13}$$

In other words, the transformation of a number in the Montgomery domain requires a real modular reduction.

Moreover, in the Montgomery domain a multiplication function is defined:

$$\text{MontyMul}(A, B) = A * B * R^{-1} \bmod n \tag{14}$$

which, applied to two generic factors A and B, gives the result as the product of the factors A and B multiplied by the inverse of the Montgomery constant R.

By applying the multiplication function (14) to the factors a1 and b1 calculated above in the Montgomery domain, the product c given from the relationship (11) in the domain of natural numbers, can be expressed in the Montgomery domain as:

$$c1 = \text{MontyMul}(a1,b1) = a*b*R \bmod n \quad (15)$$

If from the result of the relationship (15) in the Montgomery domain it is desired to re-obtain the corresponding value c of the product (11) in the domain of natural numbers, it is sufficient to divide the result c1 of the relationship (15) by the constant number R, or rather $$c = c1/R = a*b \quad (16)$$

It should be observed that, in practical cases, the Montgomery constant R is selected equal to a power of 2 so as to simplify the operation of reducing by R and at the same time ensure that each division by such a constant R in the Montgomery domain is equivalent to a shifting operation.

It should also be observed that the multiplication function MontyMul (A, B) defined above can advantageously be used so as to convert any natural number a into a corresponding number a1 in the Montgomery domain. In such a case, the natural number a to be transformed corresponds to the first coefficient A of the aforementioned function, whereas a known parameter $MP = R^2 (\bmod n)$, which is called a Montgomery parameter, is selected as the second coefficient B.

For example, in the Montgomery domain, the number a1 corresponding to the natural number a can be calculated as:

$$\text{MontyMul}(a,R^2) = a*R^2*R^{-1} (\bmod n) = a*R (\bmod n) = a1 \quad (17)$$

It should be observed that the Montgomery parameter MP may require a real modular reduction in order to be calculated.

Analogously, the same function MontyMul(A, B) can be used to re-convert the number a1 from the Montgomery domain to the domain of natural numbers, based on the relationship:

$$\text{MontyMul}(a1,1) = a*R*R^{-1} (\bmod n) = a \quad (18)$$

In order to ensure that the computation of a modular exponential function is protected from a Side-Channel attack or SCA, for example a Differential Power Analysis (DPA) attack, the method 200 for encrypting a message M according to an embodiment foresees the introduction of a random parameter, i.e., randomizing, the aforementioned Montgomery parameter MP. Such an exponential function is, for example, calculated in relationship to an encryption operation, decryption operation, or digital signature of the message M through the RSA algorithm with asymmetrical keys.

With reference to FIG. 2, the method 200 for encrypting a message M includes, according to an embodiment, a symbolic start step STR.

Again with reference to FIG. 2, the method 200 according to an embodiment includes a step of initialization 201. Such a step of initialization 201 includes a respective step of calculating (202) the square of the aforementioned Montgomery constant R, i.e., $R^2$.

The initialization step 201 includes, moreover, a step of acquiring an index k representative of a protection level of the secret parameter, i.e., of a secret key d, of the algorithm RSA. For example, by working with an algorithm RSA with a module n of 2048 bits, the selected index k can take on, for example, the value of 64 bits.

Based upon the value of such an index k=64 bit, in a subsequent step 203, a random number rand is generated corresponding to one among $2^k=2^{64}$ bit combinations. It should be observed that the number $2^k$ of possible random numbers rand which can be generated represents a measurement of the degree of security ensured by the method 200. In particular, the random number rand is generated so as to correspond to one of the aforementioned $2^k$ possible bit combinations in a non-predictable manner and evenly distributed between 0 and $(2^k-1)$.

Such a random number rand is generated by the electronic device 100 every time the cryptographic method 200 runs. It should be observed that every time the method is carried out, the random number rand is generated with a probability equal to $1/2^k$.

The aforementioned step of initialization 201 includes, moreover, a calculating step 204 for calculating a respective Montgomery parameter, or a randomized Montgomery parameter, MP'. Such a computation step 204 includes, preliminarily, a step 205 of generating a further module n' suitable for being used in operations of modular multiplication in the Montgomery domain. Such a further module n' is calculated from the module n, through the following relationship:

$$n' = n*(2^k-1) = n*(2^{64}-1) \quad (19)$$

It should be observed that following the increasing of the module n of the algorithm RSA obtained based on the relationship (19), the cryptographic method 200 is suitable for associating to the domain of natural numbers a number equal to $2^{64}-1$ Montgomery domains.

Based upon the further module n' and on the random number rand, the randomized Montgomery parameter MP' is calculated in step 204 based upon the following expression:

$$MP' = R^2 (\bmod n') + n'*\text{rand} \quad (20)$$

i.e., the square of the Montgomery constant $R^2$ undergoes a modular reduction based upon the aforementioned further module n', and an integer multiple of the random number rand is added to the result of such an operation.

Subsequently, the method for encrypting 200 foresees the acquisition of the message M to perform a step of generating 206 a representation M1 of such a message M in the Montgomery domain. In greater detail, the message M is converted from the domain of natural numbers into one of said $2^{64}-1$ Montgomery domains by applying the Montgomery conversion function MontyMul(A,B) mentioned above to the message M itself and to the randomized Montgomery parameter MP'. The representation M1 of the message M in the Montgomery domain is obtained with the relationship:

$$M1 = \text{MontyMul}(M,MP') \quad (21)$$

Subsequent to the conversion step 206, each encrypting operation, decrypting operation, or digital signature, generally indicated with the reference numeral 207 in FIG. 2, which implies the computation of an exponential function which involves the message M1 represented in the Montgomery domain, is carried out in a standard manner. For example, such exponential functions are calculated by carrying out a multitude of modular multiplications in the aforementioned Montgomery domain, for example by using a conventional Square and multiply algorithm.

It should be observed that after each computation operation of modular exponential function in the Montgomery domain, with the purpose of obtaining the result of the modular multiplications in the domain of natural numbers, the method 200 includes a step of calculating a respective modular reduction operation. Such a step of computation is schematically represented with the reference numeral 208 in FIG. 2.

In greater detail, by indicating with c' the result in the Montgomery domain of the computation of a modular exponential function relative to the message M1, so as to obtain the value corresponding to such a result c' in the domain of natural numbers, the method foresees the computation (in step 208) of a first intermediate result c'' of such a value based upon the function MontyMul shown above, i.e.:

$$c''=\text{MontyMul}(c',1) \qquad (22)$$

In accordance with an embodiment, the function MontyMul is defined based upon the further module n'. Therefore, also such a first intermediate result c'' is defined based upon the module n'.

In order to obtain the result c of the exponential operation in the domain of natural numbers without the blinding ensured by the random number rand, the modular reduction carried out in step 208 uses the original module n of the RSA algorithm. Starting from the equation (22), such a modular reduction can thus be expressed as:

$$c=c'' \bmod n.$$

The method 200 for encrypting the message M symbolically finishes off with an end step ED.

Advantageously, with an embodiment of the method 200, the input data, i.e., the messages M, of each modular exponential operation is transformed in the respective representation of the Montgomery domain through the randomized Montgomery parameter MP'. Such input data depends, consequently, upon the random number rand selected from one of the possible $2^{64}$ numbers.

Therefore, even if the item of input data of a plurality of exponentialization operations was to remain constant, the representation of such an item of data shown in one of $2^{64}-1$ Montgomery domains in any case would be variable for each of such exponentializations based upon the variation of the random number rand.

In general, the provision of introducing the random number rand inside the Montgomery parameter MP' substantially prevents Side-Channel attacks DPA. Indeed, the computation of an exponential decrypting or signature function, with the relative modular multiplications, is carried out on one item of data, i.e., the random number rand itself, which is unknown to the code cracker, who, with the DPA method, is not capable of reconstructing the bits of the secret key of the algorithm RSA. In addition to the example of the algorithm RSA, an embodiment may, advantageously, be applied also by other cryptographic algorithms, for example ECC, which require the computation of a plurality of modular multiplications.

Again with reference to the embodiment relative to the application of the algorithm RSA, advantageously, the step of initialization 201 of the method 200, and in particular the step of generation of the randomized Montgomery parameter MP', can be carried out by the electronic device 100 before the base (i.e., the message M) and the exponent of the exponential function to be calculated in the step of exponentialization 207 are known. In other words, the computation step 205 of the randomized Montgomery parameter MP' is independent from the step of exponentialization 207, i.e., such a randomized Montgomery parameter MP' can be entirely pre-calculated.

Further advantages of the cryptographic method 200 according to the example just described can be explained by making a comparison with currently known blinding methods.

With respect to the blinding method in which the random number rand is associated with the message to be encrypted, an embodiment of the method 200 has an advantage of avoiding additional inversion or exponentialization operations.

In comparison to the blinding method in which the random number rand is associated with the operation of modular reduction, an embodiment of the method 200 does not impose limits on the random number rand which can be used. Such a number can be even, odd, and also equal to zero.

With respect to the blinding method in which the random number rand is associated with the exponent of the operation of exponentialization, an embodiment of the method 200 avoids taking up space in the memory of the device 100 with additional data or parameters necessary for the processing.

One of skill in the art can bring modifications, adaptations, and replacements to the embodiments of the cryptographic method described above, in order to satisfy contingent requirements, without, for this reason departing, from the scope of the disclosure. Furthermore, each of the features described as belonging to a possible embodiment can be made independently from the other embodiments described.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. An apparatus, comprising:
   calculator circuitry configured to calculate a randomized number and a first parameter representative of an operation of squaring of a Montgomery number co-prime of a module of a cryptographic algorithm and eater than the module, wherein the calculator circuitry is further operable to calculate a Montgomery parameter based on the first parameter and an integer multiple of the randomized number;
   converter circuitry configured to generate a representation of a message to be encrypted in a Montgomery domain through a Montgomery conversion function applied to the message and to the Montgomery parameter; and
   coder circuitry configured to encrypt the representation of the message in the Montgomery domain.

2. The apparatus of claim 1 wherein the calculator circuitry is further configured to generate a further module based on the relationship:

$$n'=n*(2k-1),$$

wherein k is an index representative of a protection level of a secret parameter of said cryptographic algorithm.

3. The apparatus of claim 1 wherein the calculator circuitry is further configured to calculate the Montgomery parameter based on the expression:

$$MP'=R2(\bmod n')+n*\text{rand},$$

where R is the Montgomery number, n is the module of the cryptographic algorithm, n' is the further module, and rand is the generated random number.

4. The apparatus of claim 1, wherein the calculator circuitry further comprises:
   generator circuitry configured to select randomly a number from a finite group of numbers; and
   wherein the calculator circuitry is configured to calculate the randomized number in response to the selected number.

5. The apparatus of claim 1 wherein the finite group of numbers comprises a number from $2^k$ bit combinations, secret parameter of the cryptographic algorithm.

6. The apparatus of claim 1 wherein the coder circuit is further configured to calculate a mathematical function on the message represented in the Montgomery domain to obtain a computation result and to calculate an operation of modular reduction on the computation result using the module of the cryptograph algorithm.

7. The apparatus of claim 1 wherein the coder circuitry is configured to encrypt the representation of the message the Montgomery domain based on an exponential function.

8. The apparatus of claim 1 wherein the coder circuitry is configured to encrypt the representation of the message in the Montgomery domain based on a square-and-multiply algorithm.

9. The apparatus of claim 1 wherein the coder circuitry is further configured to calculate an intermediate result of the computation result of the mathematical function based on the Montgomery conversion function.

10. A system, comprising:
    a first integrated circuit including,
        calculator circuitry configured to calculate a randomized number and a first parameter representative of an operation of squaring of a Montgomery number coprime of a module of a cryptographic algorithm and greater than the module, wherein the calculator circuitry is further operable to calculate a Montgomery parameter based on the parameter and an integer multiple of the randomized number;
    converter circuitry configured to generate a representation of a message to be encrypted in a Montgomery domain through a Montgomery conversion function applied to the message and to the Montgomery parameter;
    coder circuit configured to encrypt the representation of the message in the Montgomery domain; and
    a second integrated circuit coupled to the first integrated circuit.

11. The system of claim 10 wherein one of the first and second integrated circuits includes a processing unit.

12. The system of claim 10 wherein the first and second integrated circuits are disposed on a same die.

13. The system of claim 10 wherein the first and second integrated circuits are disposed on respective dies.

* * * * *

UNITED STATES PATENT AND TRADEMARK OFFICE
CERTIFICATE OF CORRECTION

PATENT NO.        : 9,152,383 B2
APPLICATION NO.   : 13/669213
DATED             : October 6, 2015
INVENTOR(S)       : Guido Marco Bertoni et al.

It is certified that error appears in the above-identified patent and that said Letters Patent is hereby corrected as shown below:

Column 10, Line 33:
"module of a cryptographic algorithm and eater than the" should read, --module of a cryptographic algorithm and greater than the--.

Column 11, Line 3:
"6. The apparatus of claim 1 wherein the coder circuit is" should read, --6. The apparatus of claim 1 wherein the coder circuitry is--.

Column 11, Line 10:
"configured to encrypt the representation of the message the" should read, --configured to encrypt the representation of the message in the--.

Column 12, Line 5:
"parameter based on the parameter and an integer" should read, --parameter based on the first parameter and an integer--.

Signed and Sealed this
Twelfth Day of July, 2016

Michelle K. Lee
*Director of the United States Patent and Trademark Office*